United States Patent
Iijima et al.

[11] Patent Number: 5,970,776
[45] Date of Patent: Oct. 26, 1999

[54] APPARATUS FOR FORMING A CUP-SHAPED CAGE

[75] Inventors: Mitsumasa Iijima; Masao Sakamoto; Tadanori Baba, all of Kanagawa, Japan

[73] Assignee: Unisia Jecs Corporation, Atsugi, Japan

[21] Appl. No.: 09/031,703

[22] Filed: Feb. 27, 1998

[30] Foreign Application Priority Data

Feb. 28, 1997 [JP] Japan .................................... 9-060166

[51] Int. Cl.⁶ .................................................. B21D 22/06
[52] U.S. Cl. ............................................. 72/353.4; 72/393
[58] Field of Search ............................. 72/353.2, 353.4, 72/353.6, 393

[56] References Cited

U.S. PATENT DOCUMENTS

| | | | |
|---|---|---|---|
| 565,993 | 8/1896 | Ketchum ................................ | 72/353.4 |
| 1,997,323 | 4/1935 | Strnad ................................... | 72/353.4 |
| 2,198,873 | 4/1940 | Hinsdale ............................... | 72/353.6 |
| 3,986,250 | 10/1976 | Belsdorf ................................ | 29/511 |
| 4,559,692 | 12/1985 | Morin .................................... | 29/441 |
| 4,843,864 | 7/1989 | Welschof ............................... | 72/355 |
| 4,942,652 | 7/1990 | Hazebrook et al. ................... | 27/898 |
| 5,001,920 | 3/1991 | Ishinaga et al. ...................... | 72/345 |

FOREIGN PATENT DOCUMENTS 59-24545 2/1984 Japan .

*Primary Examiner*—Lowell A. Larson
*Attorney, Agent, or Firm*—Foley & Lardner

[57] ABSTRACT

An apparatus for forming a cup-shaped cage, including a cup-shaped workpiece, an outer die having a center axis and a cavity about the center axis, an inner die coaxially disposed within the cavity of the outer die, and a mandrel adapted to move axially and radially the inner die relative to the outer die. The outer and inner dies have first and second control surfaces which are engaged with outer and inner surfaces of the workpiece, respectively, when the outer and inner dies are in the cooperative press position. The outer die includes a part allowed to be out of contact with the outer surface of the workpiece to permit the movement of the inner die relative to the outer die into the cooperative press position.

21 Claims, 4 Drawing Sheets

5,970,776

APPARATUS FOR FORMING A CUP-SHAPED CAGE

BACKGROUND OF THE INVENTION

1. Field of the Invention

The present invention relates to an apparatus for forming a cup-shaped cage as an outer member of a universal joint such as a ball joint.

2. Description of the Related Art

One kind of such apparatus is disclosed in Japanese Patent Application First Publication No. 59-24545. The apparatus includes an outer die retaining a cup-shaped workpiece for a cup-shaped cage and a plurality of inner die segments moveable relative to the outer die. The cup-shaped workpiece includes a shaft portion and a cup-shaped body portion connected with the shaft portion. The outer die retains the shaft portion of the cup-shaped workpiece and a bottom part of the cup-shaped body portion thereof which is disposed adjacent the shaft portion. A plurality of press-forming members are circumferentially arranged on the outer die. The press-forming members are adapted to be moved relative to a radially expanding part connected with the bottom part of the cup-shaped workpiece. The press-forming members each have surfaces of a predetermined shape and come into engagement with an outer circumferential surface of the radially expanding part. The inner die segments include pivotal portions each rotatable about a pin and formed with outer surfaces configured to a predetermined shape. A mandrel forces the inner die segments to move into an inside space of the cup-shaped cage and urges the pivotal portions to rotationally move into a press position in which the outer surfaces of the pivotal portions are brought into engagement with an inner surface of the cup-shaped workpiece.

In the above-described kind of apparatus, the outer die retains the bottom part of the cup-shaped body portion of the cup-shaped workpiece without a clearance therebetween. With this arrangement, in a case where the bottom part of the cup-shaped body portion of the workpiece has an uneven inner surface with a projection, the pivotal portions of the inner die segments are likely to be prevented from moving into the press position by abutting on the projection so that the inner surface of the cup-shaped workpiece cannot be formed into a configuration conformed to the predetermined shape of the outer surfaces of the pivotal portions. This tends to cause failure of forming the outer surface of the cup-shaped workpiece into a shape conformed to the predetermined shape of the surface of the press-forming members of the outer die.

SUMMARY OF THE INVENTION

It is an object of the present invention to provide an apparatus for forming a cup-shaped cage, capable of assuring that a workpiece is formed with inner and outer surfaces configured to respective predetermined shapes.

According to one aspect of the present invention, there is provided an apparatus, comprising:

a cup-shaped workpiece;

an outer die having a center axis, a cavity about the center axis, and a first control surface coming into engagement with an outer surface of the cup-shaped workpiece;

an inner die coaxially disposed within the cavity of the outer die, the inner die having a second control surface coming into engagement with an inner bottom surface and an inner surface of the cup-shaped workpiece; and the cup-shaped workpiece being disposed between the outer and inner dies;

the outer and inner dies having a cooperative press position in which the cup-shaped workpiece is pressed against the outer and inner dies;

a mandrel adapted to move axially and radially the inner die relative to the outer die;

a part of the outer die being allowed to be out of contact with the outer surface of the cup-shaped workpiece to permit the movement of the inner die relative to the outer die into the cooperative press position.

According to another aspect of the present invention, there is provided an arrangement; comprising:

a cup-shaped workpiece;

an outer die having a center axis, a cavity about the center axis, and a first control surface coming into engagement with an outer surface of the cup-shaped workpiece;

an inner die coaxially disposed within the cavity of the outer die, the inner die having a second control surface coming into engagement with an inner surface of the cup-shaped workpiece; and the cup-shaped workpiece being disposed between the outer and inner dies;

the outer and inner dies having a cooperative press position in which the cup-shaped workpiece is pressed against the outer and inner dies;

a mandrel adapted to move axially and radially the inner die relative to the outer die;

the outer die including a contact portion contacted with the outer surface of the cup-shaped workpiece and a contact-free portion out of contact with the outer surface of the cup-shaped workpiece, the contact-free portion being arranged about the center axis to permit the movement of the inner die relative to the outer die into the cooperative press position, the contact-free portion being disposed inside the contact portion.

DESCRIPTION OF THE PREFERRED EMBODIMENT

Figure 1:
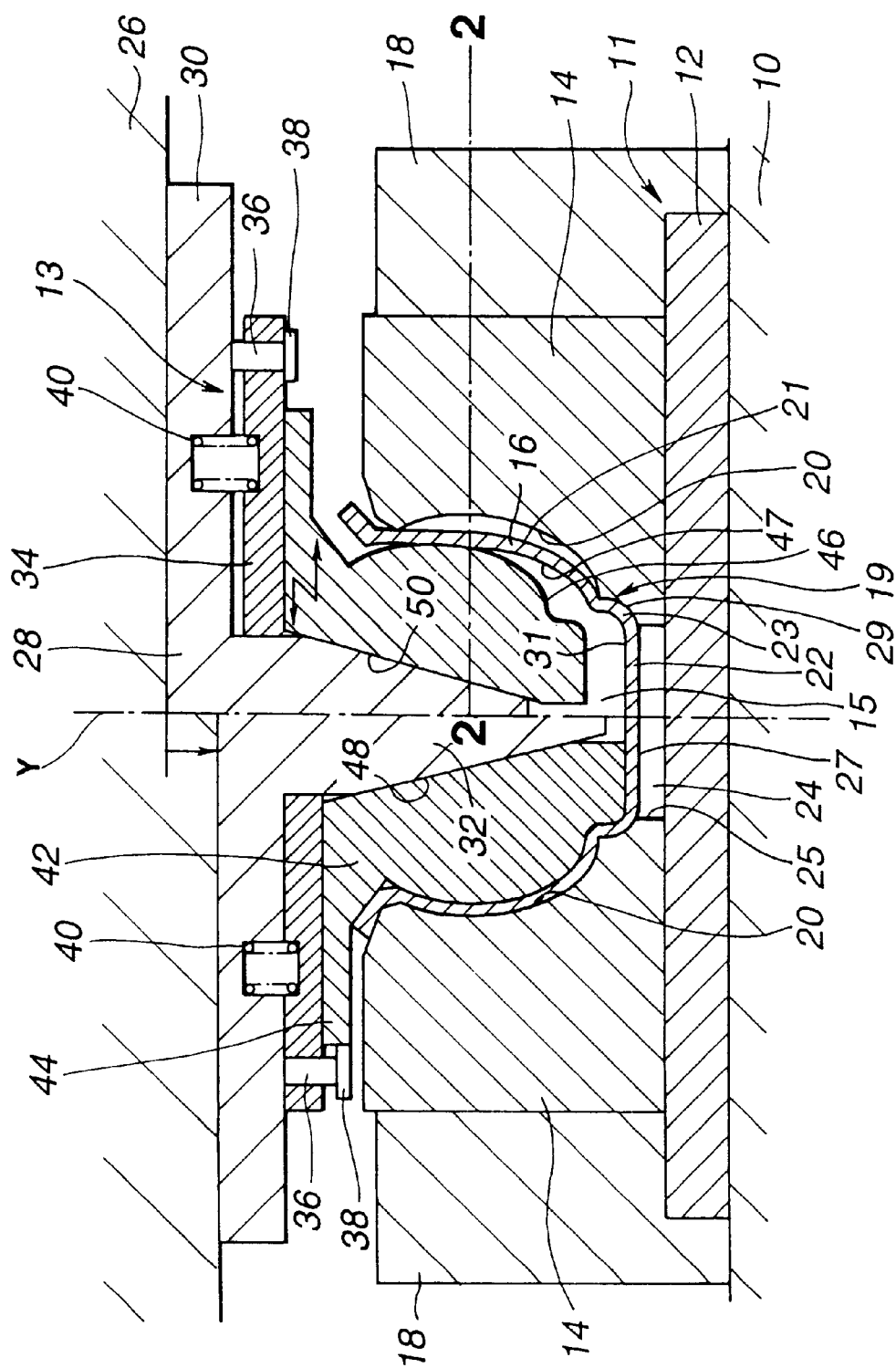
FIG. 1 is a section of an apparatus of a first embodiment according to the present invention, taken along a center axis Y of inner and outer dies of the apparatus, which shows a workpiece before being formed into a cup-shaped cage on the right side of the center axis Y and the cup-shaped cage formed on the left side of the center axis Y.
Figure 2:
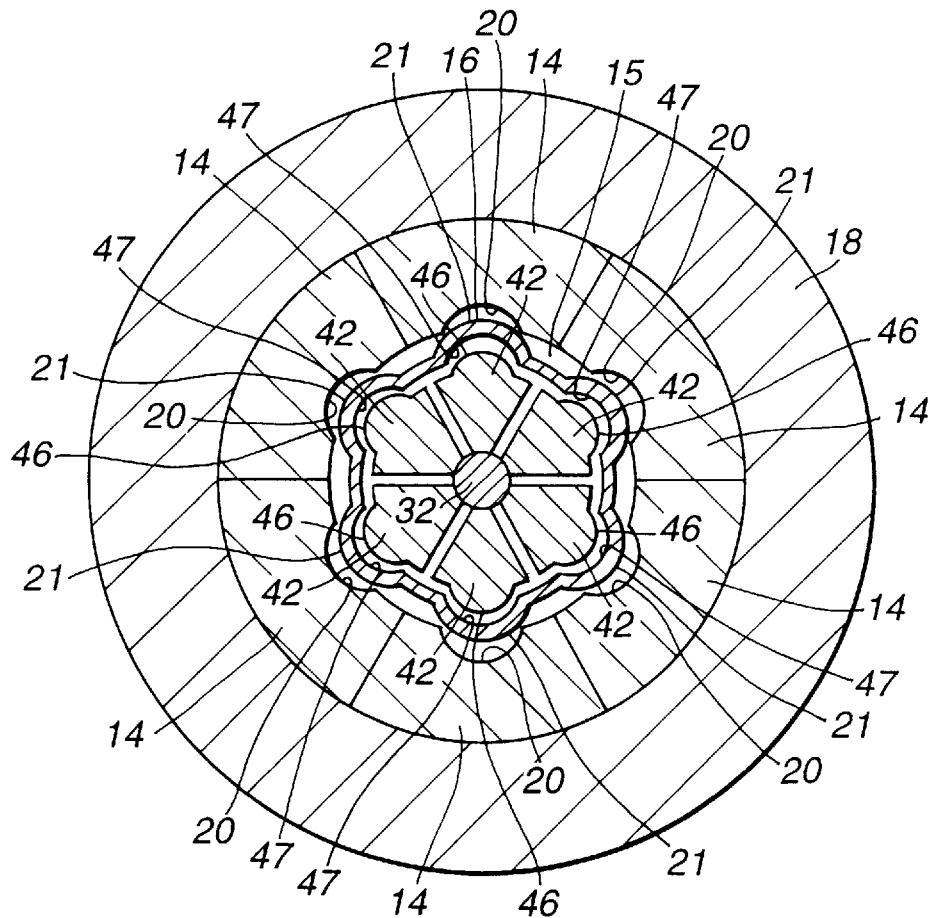
FIG. 2 is a cross-section of the apparatus shown in FIG. 1, taken along the line 2—2 of FIG. 1.

Referring to FIGS. 1 and 2, a first embodiment of an apparatus for forming a cup-shaped cage, according to the present invention, is now explained.

As illustrated in FIG. 1, the apparatus includes an outer die 11 having a center axis Y and a cavity 15 about the center axis Y, an inner die 13 coaxially disposed within the cavity 15, and a mandrel 28 adapted to move axially and radially the inner die 13 relative to the outer die 11. A cup-shaped workpiece 16 is disposed between the outer and inner dies 11 and 13. The cup-shaped workpiece 16 includes a reduced-diameter lower portion, a swelled upper portion extending outward from the lower portion and having an larger diameter than the lower portion, and a top flange portion extending outward from the swelled upper portion. The lower portion includes a planar bottom 22 and a curved periphery 23 extending angularly upward as viewed in FIG. 1, from a peripheral edge of the bottom 22. The workpiece 16 is supported at the curved periphery 23 of the lower portion by the outer die 11.

The outer die 11 includes an outer die body support 12 and an outer die body 14 mounted to the outer die body support 12. The outer die body support 12 is secured to a base 10. The outer die body 14 is of a generally annular shape in cross-section as shown in FIG. 2 and fixedly supported on the outer die body support 12 by an annular outer die retainer 18 which is secured to the support 12. The outer die body 14 defines the cavity 15 of a generally spherical shape. The outer die body 14 has a workpiece retaining portion 19 supporting the curved periphery 23 of the reduced-diameter lower portion of the cup-shaped workpiece 16.

The outer die body 14 includes a plurality of outer die body segments, six outer die body segments in this embodiment, which are circumferentially disposed about the center axis Y inside the outer die retainer 18, as shown in FIG. 2. Each of the outer die body segments 14 has a first control surface 20 coming into engagement with an outer surface of the cup-shaped workpiece 16, specifically, a circumferential outer surface portion 21 formed on the outside of the swelled lower portion. The first control surface 20 has a predetermined configuration. In this embodiment, the first control surface 20 is defined by a groove of a part-spherical shape in cross-section as shown in FIG. 2, which is formed on a circumferential inside surface of the outer die body segment 14. The outer die body 14 may be formed as one piece.

The outer die 11 includes a part allowed to be out of contact with the outer surface of the cup-shaped workpiece 16 to permit the movement of the inner die body 42 relative to the outer die 11. The part of the outer die 11 and the outer surface of the workpiece 16 cooperate to define a clearance 24 therebetween. Concretely, the part of the outer die 11 is a recessed portion 25 defined by the outer die body support 12 and the outer die body 14. The recessed portion 25 is in the form of a cylindrical center opening which is formed about the center axis Y in the outer die body 14 and closed at one end thereof by the outer die body support 12. The recessed portion 25 extends along the center axis Y. The recessed portion 25 is disposed inside the first control surface 20 with respect to the center axis Y.

Figure 3:
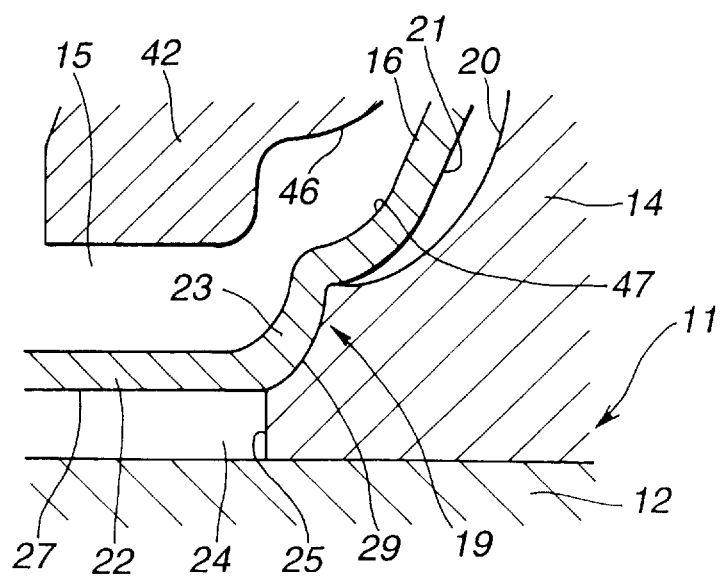
FIG. 3 is a fragmentary enlarged view of a part of the apparatus shown on the right side of the center axis Y in FIG. 1.

As best shown in FIG. 3, the recessed portion 25 of the outer die 11 is opposed to a bottom outer surface portion 27 of the outer surface of the workpiece 16 which is formed on the bottom 22. The clearance 24 exists between the bottom outer surface portion 27 of the workpiece 16 and one side face of the outer die body support 12. The workpiece retaining portion 19 disposed outside the recessed portion 25 is contacted with a peripheral outer surface portion 29 of the outer surface of the workpiece 16 which is formed on the curved periphery 23 of the workpiece 16. The peripheral outer surface portion 29 extends between the circumferential outer surface portion 21 and the bottom outer surface portion 27.

In other words, the outer die 11 includes a contact portion, i.e., the workpiece retaining portion 19, which is in contact with the workpiece 16 and a contact-free portion, i.e., the recessed portion 25, which is out of contact with the workpiece 16. The workpiece 16 is retained by the outer die 11 in such a manner that the bottom 22 out of contact with the outer die 11 is permitted to resiliently deform downward as viewed in FIG. 1, into the recessed portion 25 along the center axis Y when a pressure force is applied onto the bottom 22.

The inner die 13 includes an inner die body support 34 mounted to the mandrel 28 and an inner die body 42 mounted to the inner die body support 34. Specifically, the inner die body support 34 extends perpendicular to the center axis Y and is mounted to a mount portion 30 of the mandrel 28 by means of guide pins 36. The mandrel 28 is secured at the mount portion 30 to a mandrel support 26 moveable relative to the base 10. The mandrel support 26 is operated by a driving device, not shown. Each guide pin 36 extends along the center axis Y from the mount portion 30 of the mandrel 28. The guide pin 36 has a head 38 having an increased diameter so as to determine a maximum of an axial movement of the inner die body support 34 toward the base 10. The inner die body support 34 is prevented from axially moving when the inner die body support 34 abuts on the head 38 of the guide pin 36 as shown in the right side of FIG. 1. By such arrangement of the guide pins 36, the inner die body support 34 is moveable along the center axis Y and fixed in a direction perpendicular to the center axis Y. The inner die body support 34 is always biased toward the base 10 by a return spring 40 installed between the inner die body support 34 and the mount portion 30 of the mandrel 28.

The inner die body 42 includes a plurality of inner die body segments circumferentially arranged inside the cup-shaped workpiece 16 within the cavity 15 of the outer die 11. In this embodiment, there are six inner die body segments 42 as shown in FIG. 2. Each inner die body segment 42 has a radially extending base portion 44 at which the inner die body segment 42 is mounted to the inner die body support 34 to be radially slidable thereon by means of a sliding device, not shown. The radially sliding movement of the inner die body segment 42 is restricted when a radial end of the base portion 44 contacts the head 38 of the guide pin 36 on the inner die body support 34 as illustrated on the left side of FIG. 1. Thus, a maximum of the radially sliding movement of the inner die body segment 42 is determined by the head 38 of the guide pin 36. The inner die body segment 42 has a pendent portion extending from the base portion 44 along the center axis Y, and a reduced-diameter protrudent portion connected with the pendent portion and having a smaller radius than the pendent portion. The inner die body segment 42 has a second control surface 46 coming into engagement with an inner surface of the cup-shaped workpiece 16, specifically, a circumferential inner surface portion 47 formed on the inside of the swelled upper portion. The second control surface 46 is arranged on the outside of the pendent portion so as to be opposed to the first control surface 20 of the outer die body segment 14 when the inner die body segment 42 is placed in a cooperative press position as described below. The second control surface 46 is of a predetermined configuration which, in this embodiment, is defined by a projection having a part-spherical shape in cross-section as shown in FIG. 2. The reduced-diameter protrudent portion of the inner die body segment 42 is brought into contact with a peripheral inner surface portion disposed inside the curved periphery 23 of the lower portion of the workpiece 16, when the inner die body segment 42 is placed in the cooperative press position.

The inner die body segments 42 have sloped bearing surfaces 50 inclined relative to the center axis Y and engaged with a pressure surface 48 of a frustoconical shaft portion 32 of the mandrel 28. The frustoconical shaft portion 32 is connected with the mount portion 30 and has a center axis aligned with the center axis Y of the outer die 11. Each of the inner die body segments 42 is forced to move axially and radially by a pressure force applied to the bearing surface 50 through the pressure surface 48 of the frustoconical shaft portion 32 of the mandrel 28.

The outer and inner dies 11 and 13 have the cooperative press position in which the cup-shaped workpiece 16 is pressed against the outer and inner dies 11 and 13 to be formed into a cup-shaped cage as shown on the left side of FIG. 1. In the cooperative press position, the first control surface 20 of the outer die body 14 of the outer die 11 is engaged with the circumferential outer surface portion 21 of the swelled upper portion of the workpiece 16, and the second control surface 46 of each inner die body segment 42 of the inner die 13 is engaged with the circumferential inner surface portion 47 of the swelled upper portion of the workpiece 16.

An operation of the apparatus will be explained hereinafter.

First, the mandrel support 26 is placed distant from the base 10. The outer and inner dies 11 and 13 are spaced axially and radially apart from each other. The cup-shaped workpiece 16 is positioned in the cavity 15 of the outer die 11 in such a manner that the curved periphery 23 of the lower portion of the workpiece 16 is supported on the workpiece retaining portion 19 of the outer die body 14. In this condition, the bottom outer surface portion 27 of the bottom 22 of the workpiece 16 is free from contact with the outer die 11 with the clearance 24 therebetween. On the other hand, the peripheral outer surface portion 29 of the curved periphery 23 of the workpiece 16 is contacted with the workpiece retaining portion 19 of the outer die body 14.

Next, the mandrel support 26 is moved toward the base 10 along the center axis and placed into a position illustrated on the right side of FIG. 1. In this position, the inner die body support 34 biased by the return spring 40 is prevented from being moved axially downward by engagement with the head 38 of the guide pin 36. As the mandrel support 26 thus axially moves, the mandrel 28 forces the inner die body segments 42 of the inner die 13 to move inside the cup-shaped workpiece 16 and into an initial position shown on the right side of FIG. 1. The protrudent portion of each inner die body segment 42 is spaced apart from a bottom inner surface portion 31 formed inside the bottom 22 of the workpiece 16.

When the mandrel support 26 is moved close to the base 10, the mandrel 28 moves axially downward as viewed in FIG. 1. Upon the axial movement of the mandrel 28, the pressure surface 48 of the frustoconical shaft portion 32 of the mandrel 28 slides downward on the bearing surface 50 of each of the inner die body segments 42. A pressure force is applied through the pressure surface 48 of the frustoconical shaft portion 32 of the mandrel 28 onto the bearing surface 50 of the inner die body segment 42. The inner die body segments 42 are forced to move axially downward and radially outward relative to the outer die 11 and slide on the inner die body support 34. Thus, the inner die body segments 42 are displaced from the initial position into an operating position where the inner die body segments 42 are contacted at the respective protrudent portions thereof with the bottom inner surface portion 31 of the bottom 22 of the workpiece 16.

Subsequently, when the mandrel support 26 is moved closer to the base 10, the mandrel 28 is urged against the biasing force of the return spring 40 to be further moved axially toward the base 10. The pressure surface 48 of the frustoconical shaft portion 32 of the mandrel 28 slides further downward on the bearing surface 50 of each inner die body segment 42. The inner die body segments 42 are forced to move radially outward relative to the outer die 11 and slide on the inner die body support 34 while being pressed against the bottom 22 of the workpiece 16. Thus, the inner die body segments 42 are displaced from the operating position into the cooperative press position shown on the left side of FIG. 1. In the cooperative press position, each inner die body segment 42 is prevented from being moved radially outward by contact of the base portion 44 thereof with the head 38 of the guide pin 36. Thus, the inner die body segments 42 are permitted to slide on the bottom inner surface portion 31 of the bottom 22 of the workpiece 16 and move to the cooperative press position.

In the cooperative press position, each of the inner die body segments 42 presses the circumferential inner surface portion 47 of the workpiece 16 to be engaged with the second control surface 46 and then conformed to the predetermined configuration of the second control surface 46. At the same time, cooperating with the inner die body segments 42 pressing the circumferential inner surface portion 47 of the workpiece 16, the outer die body 14 forces the circumferential outer surface portion 21 of the workpiece 16 against the first control surface 20. The circumferential outer surface portion 21 of the workpiece 16 is engaged with the first control surface 20 to be conformed to the predetermined configuration of the first control surface 20. To this end, the workpiece 16 is formed into the cup-shaped cage having the respective predetermined configurations on its inner and outer surfaces.

When removing the finished cup-shaped cage from the outer and inner dies 11 and 13, the mandrel support 26 is driven in such a direction as to move away from the base 10. In this condition, the mandrel 28 is assisted by the return spring 40 to move axially upward as viewed in FIG. 1. The pressure surface 48 of the frustoconical shaft portion 32 of the mandrel 28 slides upward on the bearing surface 50 of each inner die body segment 42. By the movement of the mandrel 28, the inner die body segments 42 are allowed to move radially inward relative to the outer die 11 from the cooperative press position to the operating position. A biasing member such as a return spring may be installed between the inner die body segment 42 and the inner die body support 34 in order to assist the radial inward movement of the inner die body segment 42. Then, when the mandrel support 26 is moved farther distant from the base 10, the inner die body segments 42 are allowed to move axially upward and radially inward from the operating portion to the initial position. When the inner die body segments 42 are placed in the initial position, the finished cup-shaped cage is removed from the outer die 11.

As will be appreciated from the description as discussed above, with the arrangement in which the outer die 11 includes the free-contact portion, i.e. the recessed portion 25, which is out of contact with the bottom outer surface portion 27 of the bottom 22 of the workpiece 16, the workpiece 16 is supported on the outer die 11 in such a manner that the bottom 22 is resiliently flexible toward the recessed portion 25 when the inner die body segments 42 are urged onto the bottom 22. Thus, the inner die body segments 42 are permitted to move relative to the outer die 11 into the cooperative press position. Namely, the arrangement facilitates the axial and radial movement of the inner die body segments 42 when the inner die body segments 42 are moved to the cooperative press position. This serves for assuring that the workpiece 16 is provided with the predetermined configurations on the inner and outer surfaces, and thus enhancing a performance of the apparatus of forming the cup-shaped cage. Further, as compared with the conventional type of the apparatus using the pivotally moveable inner die segments, the apparatus of the invention has an increased mechanical strength and a more simplified structure.

Figure 4:
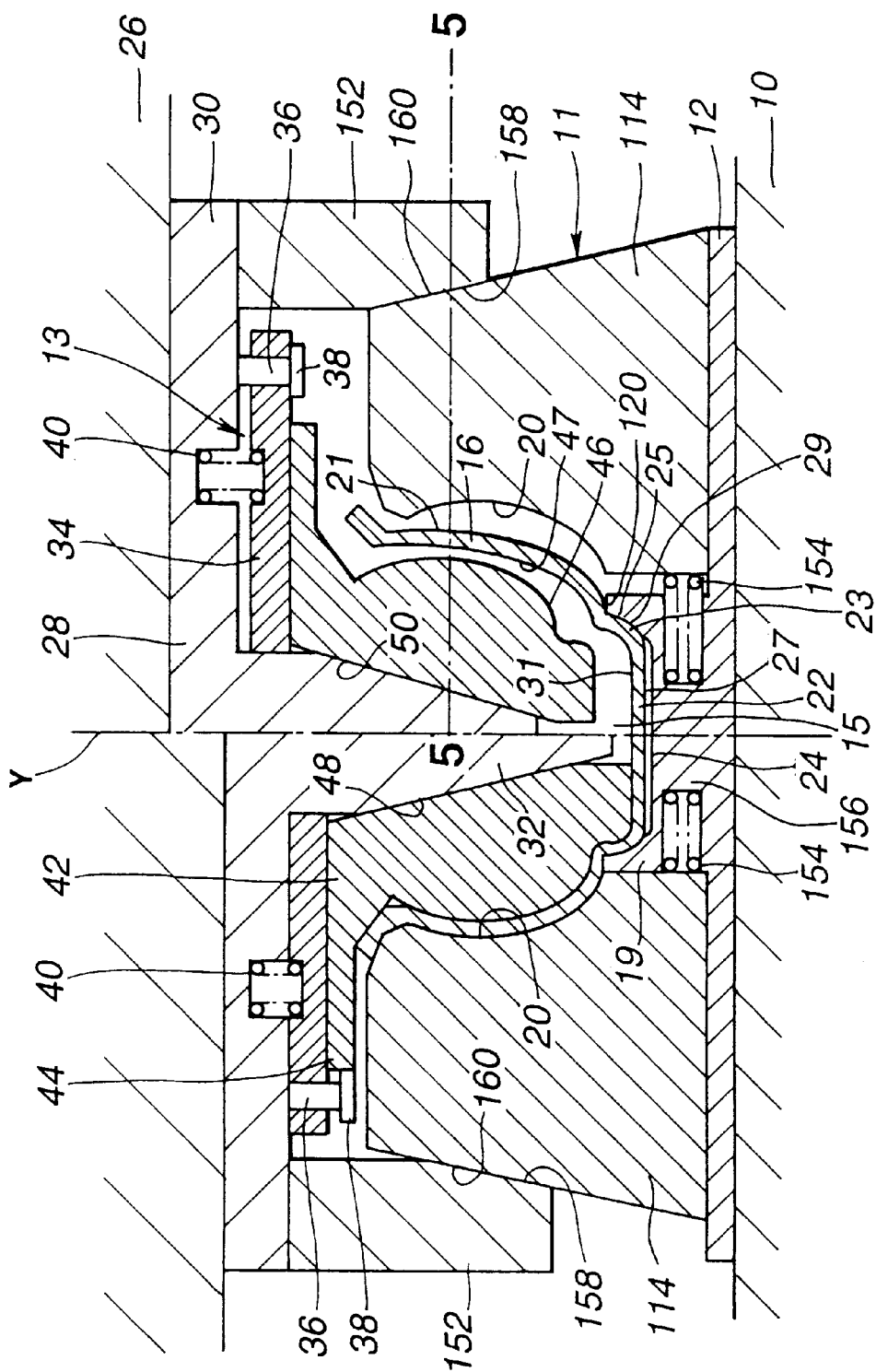
FIG. 4 is a view similar to FIG. 1, but showing the apparatus of a second embodiment according to the present invention.
Figure 5:
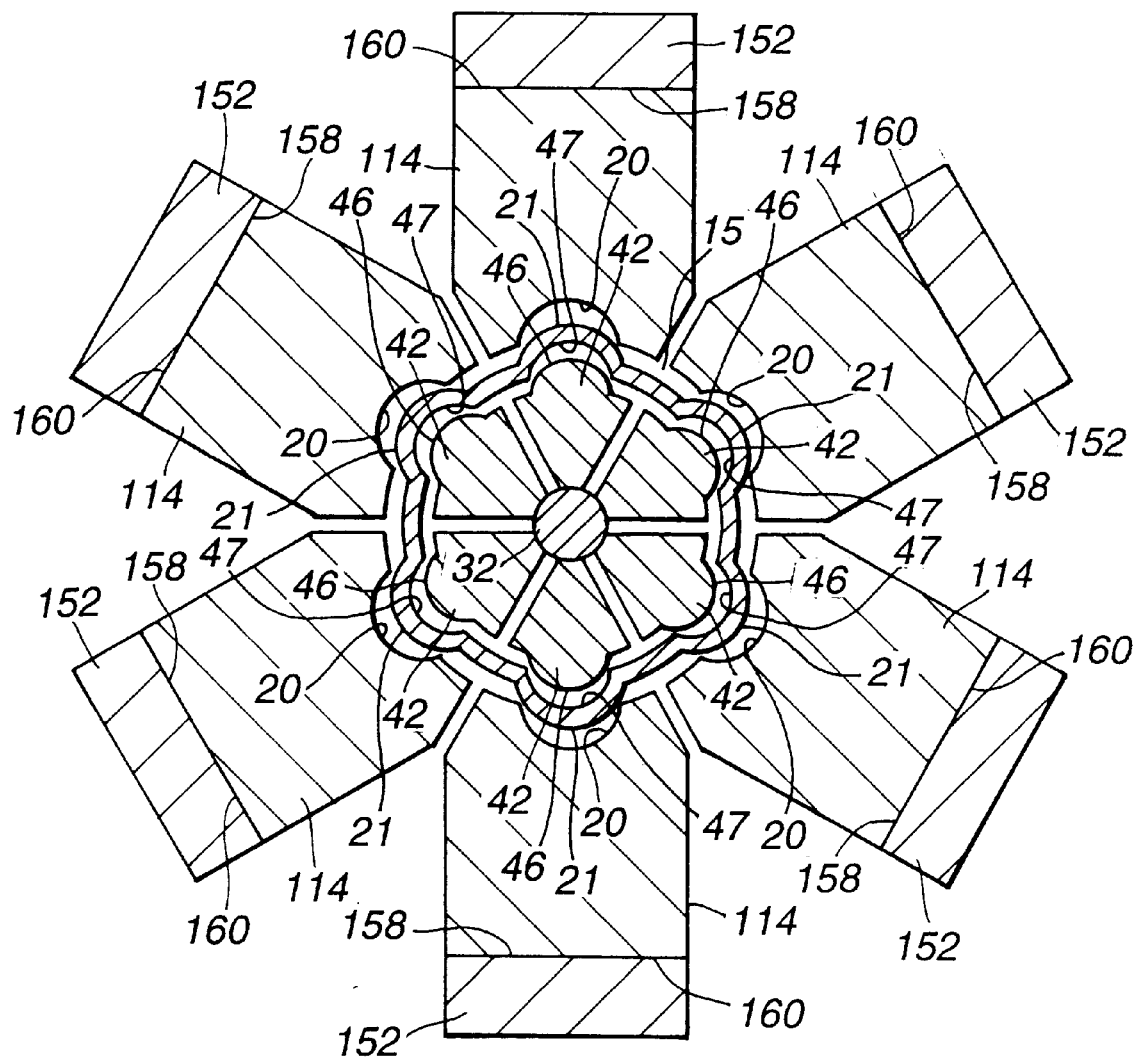
FIG. 5 is a cross-section of the apparatus shown in FIG. 4, taken along the line 5—5 of FIG. 4.

Referring now to FIGS. 4 and 5, a second embodiment of the apparatus according to the present invention is explained. The second embodiment differs from the above-described first embodiment in that a plurality of outer die body segments 114 are moveable relative to the outer die body support 12 in the direction perpendicular to the center axis Y, that a plurality of actuators 152 for the outer die body segments 114 are provided, and that the recessed portion 25 and the workpiece retaining portion 19 are disposed on the outer die body support 12. Like reference numerals denote like parts, and therefore detailed explanations therefor are omitted.

As illustrated in FIG. 4, the outer die body segments 114 are mounted to the outer die body support 12. The outer die body segments 114 are operated by a sliding mechanism, not shown, to be slidable on the outer die body support 12 in the direction perpendicular to the center axis Y. As shown in FIG. 5, the outer die body segments 114 are circumferentially arranged around the center axis Y and have a generally rectangular shape in cross-section. Each of the outer die body segments 114 is always biased radially outward by a return spring 154 connecting the outer die body segment 114 and the outer die body support 12. The outer die body segment 114 is similar to the first embodiment except the features as described above. The return spring 154 is mounted to a retainer portion 156 formed on the outer die body support 12. The retainer portion 156 extends upward as viewed in FIG. 4, along the center axis Y from the upper side face of the outer die body support 12 into the center opening formed by the outer die body segments 114. The return spring 154 is installed in a radially extending mount hole formed in the retainer portion 156.

In this embodiment, the workpiece retaining portion 19 and the recessed portion 25 are arranged on the retainer portion 156 of the outer die body support 12. The workpiece retaining portion 19 is defined by an increased diameter recess having a diameter greater than a diameter of the recessed portion 25. The recessed portion 25 extends further axially downward than the increased diameter recess. Namely, the workpiece retaining portion 19 and the recessed portion 25 are located on the upper side and the lower side of a stepped dish-like shaped recess. The workpiece retaining portion 19 includes a part as indicated at 120 in FIG. 4, of the first control surface 20 coming into engagement with the peripheral outer surface portion 29 of the curved periphery 23 of the workpiece 16. The workpiece retaining portion 19 of the outer die body support 12 cooperates with the outer die body segment 114 to form the first control surface 20. The clearance 24 exists between a bottom of the recessed portion 25 and the bottom outer surface portion 27 of the workpiece 16 supported on the workpiece retaining portion 19.

The actuators 152 are circumferentially arranged corresponding to the outer die body segments 114. The actuators 152 are secured to the mount portion 30 of the mandrel 28 and extend toward the base 10. Each of the actuators 152 has a sloped pressure surface 158 applied to an inclined bearing surface 160 located on an outer circumferential surface of each outer die body segment 114. The sloped pressure surface 158 is inclined relative to the center axis Y. The actuator 152 forces the outer die body segment 114 to slidably move radially inward to the cooperative press position.

In an operation of the apparatus of the second embodiment, when the mandrel support 26 is moved close to the base 10 to urge the mandrel 28 downward as viewed in FIG. 4, the actuators 152 force the outer die body segments 114 and slide downward on the outer die body segments 114. The pressure force of each actuator 152 is applied via the pressure surface 158 onto the bearing surface 160 of the outer die body segment 114. The actuators 152 thus force the outer die body segments 114 to slide radially inward on the outer die body support 12 against the biasing force of the return spring 154. At the same time, the inner die body segments 42 are urged by the mandrel 28 to move axially downward and radially outward. Then, as the mandrel support 26 is moved closer to the base 10, the outer die body segments 114 are forced to move from the initial position shown on the right side of FIG. 4 into the cooperative press position shown on the left side of FIG. 4, as well as the inner die body segments 42. In the cooperative press position, the outer die body segments 114 cooperate with the inner die body segments 42 to conform outer and inner surfaces of the workpiece 16 to the predetermined configurations of the first and second control surfaces 20 and 46.

In an operation of removing the finished cup-shaped cage from the outer and inner dies 11 and 13, as the mandrel support 26 moves away from the base 10, the actuators 152 slide upward on the bearing surface 160 of the outer die body segments 114. By the upward sliding movement of the actuators 152, the outer die body segments 114 are subject to the less pressure force applied by the actuators 152 through the pressure surface 158. The outer die body segments 114 are assisted by the return spring 154 to move radially outward from the cooperative press position to the initial position.

What is claimed is:

1. An apparatus comprising:

a cup-shaped workpiece having a planar bottom and an outwardly swelled portion outwardly extending around the planar bottom;

an outer die having a center axis, a cavity about the center axis, and a first control surface coming into engagement with an outer surface of the outwardly swelled portion of said cup-shaped workpiece;

an inner die coaxially disposed within the cavity of said outer die, said inner die having a second control surface coming into engagement with an inner surface of the outwardly swelled portion of said cup-shaped workpiece;

said cup-shaped workpiece being disposed between said outer and inner dies;

said outer and inner dies having a cooperative press position in which said cup-shaped workpiece is pressed against said outer and inner dies;

a mandrel adapted to move axially and radially said inner die relative to said outer die; and a recessed portion defined by said outer die, said recessed portion being disposed adjacent to the planar bottom of said cup-shaped workpiece and cooperating therewith to define a clearance extending along the center axis, said recessed portion being operative to permit the movement of said inner die relative to the outer die into the cooperative press position upon said inner die being moved on the planar bottom of said cup-shaped workpiece.

2. An apparatus as claimed in claim 1, wherein said outer die includes a workpiece retaining portion supporting said cup-shaped workpiece in contact therewith, said workpiece retaining portion being disposed outside the recessed portion with respect to the center axis.

3. An apparatus as claimed in claim 2, wherein said cup-shaped workpiece includes a peripheral portion connecting the planar bottom and the outwardly swelled portion and angularly extending from a periphery of the planar bottom, said peripheral portion being supported by the workpiece retaining portion of said outer die.

4. An apparatus as claimed in claim 2, wherein said outer die includes an outer die body support and an outer die body mounted to the outer die body support.

5. An apparatus as claimed in claim 4, wherein the outer die body is radially slidably mounted to the outer die body support.

6. An apparatus as claimed in claim 5, wherein the recessed portion is formed on the outer die body support.

7. An apparatus as claimed in claim 6, wherein the outer die body support includes a part of the first control surface.

8. An apparatus as claimed in claim 5, wherein said outer die body is biased radially outward by a return spring.

9. An apparatus as claimed in claim 8, wherein said outer die body includes a plurality of outer die body segments circumferentially arranged about the center axis.

10. An apparatus as claimed in claim 9, further comprising a plurality of actuators forcing said outer die body segments radially inward against the biasing force of the return spring.

11. An apparatus as claimed in claim 10, wherein said plurality of actuators are secured to said mandrel.

12. An apparatus as claimed in claim 11, wherein each of said plurality of actuators has a pressure surface applied to an outer circumferential surface of each of said outer die body segments.

13. An apparatus as claimed in claim 12, wherein the pressure surface is inclined relative to the center axis.

14. An apparatus as claimed in claim 4, wherein the recessed portion is in the form of a center opening formed in the outer die body.

15. An apparatus as claimed in claim 14, wherein the first control surface is formed on the outer die body.

16. An apparatus as claimed in claim 1, wherein said inner die includes an inner die body support axially moveably mounted to said mandrel, and an inner die body radially slidably mounted to the inner die body support.

17. An apparatus as claimed in claim 16, wherein said inner die body support is mounted to said mandrel by means of a guide pin having a head which determines a maximum of the axial movement of said inner die body support.

18. An apparatus as claimed in claim 1, wherein said inner die includes a plurality of inner die segments circumferentially arranged about the center axis.

19. An arrangement, comprising:

a cup-shaped workpiece having a planar bottom, an outwardly swelled portion outwardly extending around the planar bottom, and a peripheral portion connecting the planar bottom and the outwardly swelled portion and angularly extending from a periphery of the planar bottom;

an outer die having a center axis and a cavity about the center axis;

an inner die coaxially disposed within the cavity of said outer die; and a mandrel adapted to move axially and radially said inner die relative to said outer die;

said outer and inner dies having a cooperative press position in which said cup-shaped workpiece is pressed against said outer and inner dies;

said inner die including a first contact portion contacting an inner surface of said cup-shaped workpiece in the cooperative press position;

said outer die including a second contact portion contacting an outer surface of the outwardly swelled portion of said cup-shaped workpiece in the cooperative press position, a third contact portion contacting an outer surface of the peripheral portion of said cup-shaped workpiece, and a contact-free portion out of contact with an outer surface of the planar bottom of said cup-shaped workpiece;

said contact-free portion being disposed adjacent to the planar bottom of said cup-shaped workpiece and cooperating therewith to define a clearance extending along the center axis, said contact-free portion being operative to permit the planar bottom of said cup-shaped workpiece to resiliently flex toward said contact-free portion upon said inner die being moved on the planar bottom of said cup-shaped workpiece.

20. An arrangement as claimed in claim 19, wherein said third contact portion supports the peripheral portion of said cup-shaped workpiece.

21. An apparatus for forming a cup-shaped cage from a cup-shaped workpiece having a planar bottom and an outwardly swelled portion extending outwardly around the planar bottom, the apparatus comprising:

an outer die having a center axis, a cavity about the center axis, and a first control surface adapted to engage an outer surface of the outwardly swelled portion of the cup-shaped workpiece;

an inner die coaxially disposed within the cavity of said outer die, the inner die having a second control surface adapted for engaging an inner surface of the outwardly swelled portion of the cup-shaped workpiece;

said outer and inner dies having a cooperative press position adapted for pressing the cup-shaped workpiece between the outer and inner dies;

a mandrel adapted to move the inner die axially and radially relative to the outer die; and a recessed portion defined by the outer die, wherein the recessed portion is operative to permit the movement of the inner die relative to the outer die into the cooperative press position when the inner die is moved toward the outer die, wherein a clearance extending along the center axis is defined by the recessed portion and the workpiece when the workpiece is placed between the dies, and wherein the recessed portion is adapted to receive a portion of the planar bottom portion of the workpiece when it flexes.

* * * * *